April 3, 1956 F. W. GOODWIN 2,740,395
BRAZIER
Filed April 1, 1954
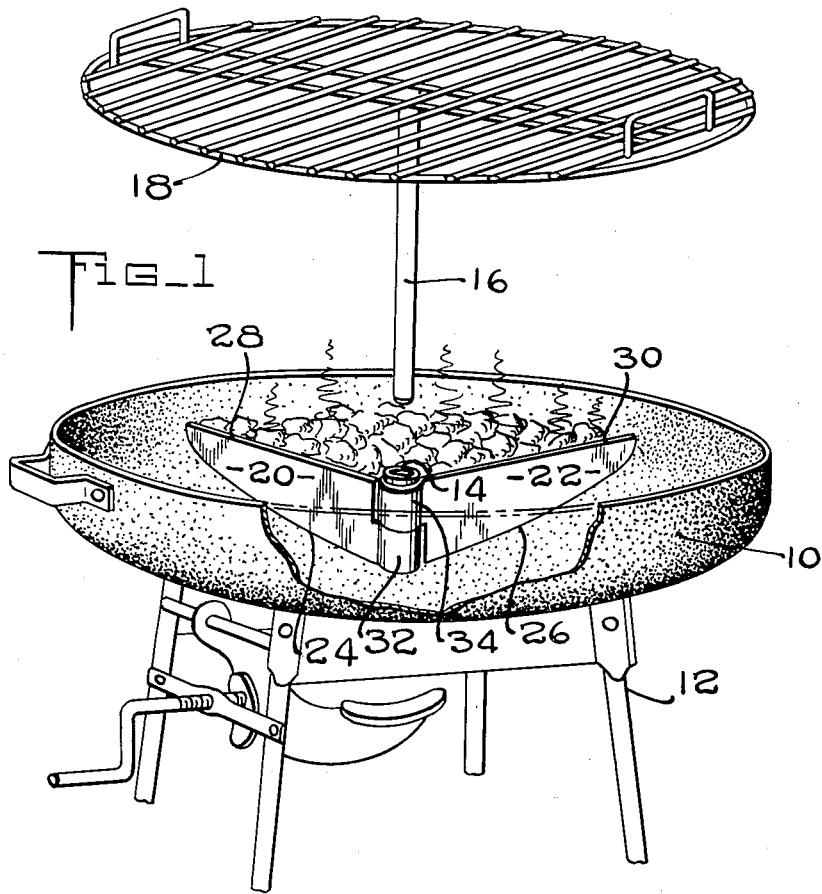
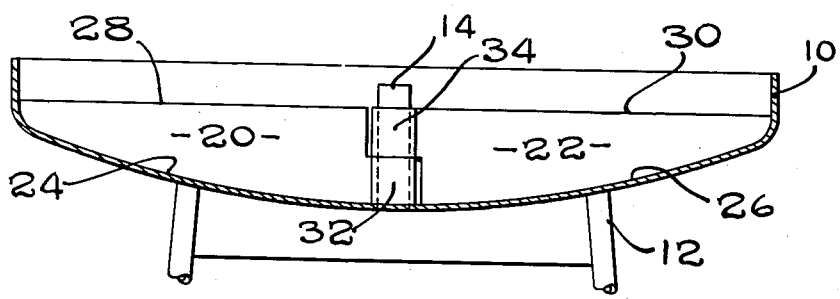
INVENTOR.
FRED W. GOODWIN.
BY K. A. Faucher
PATENT AGENT

United States Patent Office 2,740,395
Patented Apr. 3, 1956

2,740,395
BRAZIER

Fred W. Goodwin, Berkeley, Calif.

Application April 1, 1954, Serial No. 420,346

2 Claims. (Cl. 126—25)

The present invention relates to braziers of the type used for holding burning coal to provide heat for barbecuing meat and other foods. When braziers are used for this purpose, the food to be cooked is usually placed upon a grid that is held above the brazier. Most braziers are of relatively large capacity to provide a heating area that is adequate for preparing food for a dozen persons or more. To generate heat of the required intensity for cooking meat and to provide this heat with reasonable uniformity to effect uniform cooking of the meat, it is necessary to establish a bed of burning coals of certain minimum depth within the brazier. To establish such a bed involves a considerable waste of fuel when it is desired to prepare food for only a few persons.

It is an object of the present invention to provide a fuel-saving brazier, of the type referred to.

Another object of the invention is to provide a brazier, of the type referred to, which may be adjusted to cook different quantities of food without expending unnecessary quantities of fuel.

Yet another object of the present invention is to provide means for regulating the fuel capacity of braziers, of the type referred to.

Moreover, it is an object of the invention to provide a brazier whose effective fuel capacity may be altered to suit different quantities of food.

Still another object of the present invention is to provide means, in barbecuing braziers of the type referred to, for establishing areas of a different heat intensity such that foods may be cooked to different degrees within the same period of time.

Additionally, it is an object of the present invention to provide a barbecue brazier that presents areas for cooking the food and areas for keeping it warm.

These and other objects of the present invention will be apparent from the following description of the accompanying drawing which illustrates a preferred embodiment thereof and wherein:

Figure 1 is a fragmentary exploded perspective of a barbecuing brazier embodying the invention, parts of said brazier being shown in phantom lines to expose the mechanism of the invention within; and Figure 2 is a side elevation of the mechanism for regulating the fuel capacity of the brazier illustrated in Figure 1 with the brazier itself shown in section.

In Figure 1 the reference numeral 10 designates the fire bowl, of the brazier, which may be supported upon a suitable support or carriage, collectively identified by the reference numeral 12.

Formed within and rising from the center of the bowl 10 is a tubular boss 14 that is adapted to receive the stem 16 of the grill 18. Means may be provided to raise or lower the grill with respect to the bowl.

Disposed within the bowl 10 are two blades 20, 22, respectively, whose lower edges 24 and 26 are curved to follow the contour of the bowl (Figure 2) and whose straight upper edges 28 and 30 are equal in length to the maximum radius of the bowl. The inner ends of the blades 20 and 22 are formed into loops 32 and 34, respectively, that may be engaged over the tubular boss 14 for rotation thereabout as shown in both Figures 1 and 2. Said loops 32 and 34 are of a depth about equal to half the maximum depth of the blades 20 and 22, and to position said blades with their upper edges at an equal level within the bowl, the loop 32 of blade 20 is formed along the lower half of the inner edge of said blade, while the loop 34 of the other blade 22 is formed along the upper half of the inner edge of said blade, as best shown in Figure 2.

If it is desired to use the total heating area provided by the grid 18, both the blades 20 and 22 may be entirely removed from the bowl, or they may be placed into juxtaposition parallel and closely adjacent to each other. A fuel bed may then be established in the normal manner over the total concavity of the bowl. On the other hand, if a smaller heating area is adequate to prepare a meal, the blades are turned on the boss 14 into an angular position relative to each other as shown in Figure 1, wherein they define a sector of the required size within which fuel may be deposited into the bowl in sufficient depth to provide a fuel bed of substantially uniform heat intensity. Hence, a lesser quantity of fuel than required to fill the bowl will provide the proper amount of heating for cooking a lesser amount of food without impairment of the cooking process. In other words, by adjusting the blades to different angular positions relative to each other, the effective fuel bed space of the brazier may be varied at will from full capacity wherein the fuel bed occupies the total concavity of the bowl to positions wherein the fuel bed covers only desired sectors thereof, yet the fuel bed in any one of these sectors will be of substantially the same depth as if the total bowl were filled with fuel, and will thus radiate heat of substantially the same intensity over areas of different size, depending upon the quantity of food to be prepared. Thus, a very considerable saving in fuel is obtained without loss in the efficiency of the cooking process. Also, by establishing fuel beds of different depth in the two diametrically opposite bowl sectors defined by the blades 20 and 22, it is possible to create areas of different heat intensity below the grid 18. This permits steaks to be cooked to different degrees during the same time interval so that all steaks may be placed upon the grid at the same time and will be ready for serving at the same time though cooked to different desired degrees.

While I have explained my invention with the aid of an exemplary embodiment thereof, it will be understood that I do not wish to be limited to the specific constructional details illustrated and described, which may be departed from without departing from the scope and spirit of my invention.

I claim:

1. A brazier comprising a bowl adapted to support a fuel bed and having a boss rising from its center at the concave side thereof, a grid rotatably supported from said boss above the concave side of said fire bowl, and a pair of partitioning blades extending radially from said boss to the peripheral area of said bowl and mounted for rotational adjustment relative to each other so as to define below said grid in said bowl a space of predetermined angular width for a fuel bed.

2. A brazier comprising a bowl adapted to support a fuel bed and having a tubular boss rising from its center at the concave side thereof, a grid disposed above the concave side of said fire bowl and having a stem rotatably received within the said tubular boss, and a pair of partitioning blades extending radially from said center boss to the peripheral area of said bowl and having loops engaged over said boss to permit rotational adjustment relative to each other so as to define below said grid a space for a fuel bed of a size less than the full capacity of the bowl.

References Cited in the file of this patent

UNITED STATES PATENTS

| | | |
|---|---|---|
| D. 170,943 | Reinecke | Nov. 24, 1953 |
| 1,290,186 | Held | Jan. 7, 1919 |
| 2,541,528 | McAvoy | Feb. 13, 1951 |
| 2,573,988 | Saltzberg | Nov. 6, 1951 |